June 18, 1935. T. PETERSEN 2,005,162
PIPE VISE GRIPPING MEMBER
Filed Feb. 19, 1934
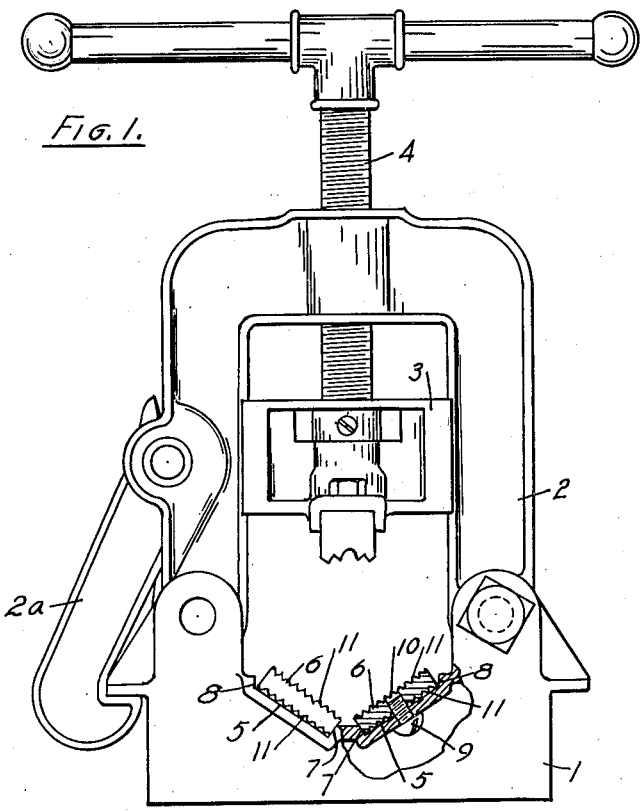
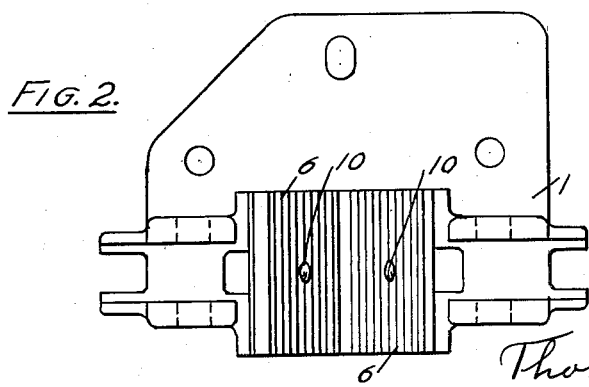

Patented June 18, 1935

2,005,162

UNITED STATES PATENT OFFICE 2,005,162

PIPE VISE GRIPPING MEMBER

Thorvald Petersen, Erie, Pa., assignor to Reed Manufacturing Company, Erie, Pa., a corporation of Pennsylvania Application February 19, 1934, Serial No. 711,948

3 Claims. (Cl. 81—38)

Pipe vises are usually provided with gripping jaws which are so formed as to indent slightly, under the pressure of the vise, the pipe engaged. The teeth of the gripping faces in use become dull and inefficient. The present invention is designed to improve the gripping surfaces of such tools by forming gripping jaws that may be readily reversed so as to present different gripping surfaces, or to present the same surfaces differently. In carrying out the invention the gripping surfaces are preferably formed on opposite faces of parallel jaw plates so that the plate may be reversed utilizing either side. In addition to this, the teeth of the jaws are so formed that the jaws may be reversed end to end. It will be understood that the torque action on the gripping surfaces is practically all in one direction and as the teeth become dull it is due largely to slipping, or action from the torque which tends to dull the teeth with relation to torque thrusts in the direction in which they have been used. By reversing the jaw end to end the surfaces are differently presented and are made more effective. Features and details of the invention will appear from the specification and claims.

A preferred embodiment of the invention is illustrated in the accompanying drawing as follows:—

Fig. 1 shows a side elevation of a pipe vise.

Fig. 2 a plan view of the base with the lower pipe jaws in place.

1 marks the base, 2 a detachable U-frame which is ordinarily hooked in position by a detachable hook 2a, 3 a sliding head and 4 a screw for operating the head.

The base is provided with jaw seats 5 on which are seated jaws 6. The seats are inclined relatively to each other and have shoulders 7 and 8 which tend to locate the jaws on the seats. The jaws are secured by screws 9 which extend through the seats and into screw-threaded openings 10 in the jaws. The jaws are provided with teeth 11, the teeth being provided with slopes of substantially equal inclinations are so shaped as to be effective as against torque in either direction. The teeth 11 are arranged on both faces of each jaw and these faces are substantially parallel so that when the jaws are reversed substantially the same inclination of jaw is maintained. The manner of attaching the jaws to the seats also permits of the jaws being reversed end to end. Some of the teeth which are operating on certain sizes of pipes wear in a manner that their effectiveness as against torque in one direction becomes quite defective, but when reversed the engaging edges are quite effective. This is also effective where the jaws are reversed from one seat 5 to the other. The same teeth will then contact the same size pipe as before reversal, but the worn end of the teeth will have become sharper in a direction to receive the torque thrust when they are reversed. The jaws utilize a very small amount of metal and consequently a high grade of metal may be used without prohibitive expense for this type of tool. The structure, therefore, presents a practical possibility of jaws of the most suitable material and jaw surfaces which may be utilized to present four different specific engagements with the pipe on which the vise is used and this may be doubled by shifting the jaws from one seat to the other. That is to say, each side of each jaw may be used and by turning each side of each jaw endwise each face may be used with a different direction of torque engagement and this may be repeated on the opposite seat. Thus the life of the vise may be very materially extended.

It will be understood that these vises are frequently used on location and the possibility of reversing the jaw faces so that the vise may be kept in effective condition assumes a very definite importance with a tool of this type.

What I claim as new is:—

1. A gripping member of a pipe vise comprising relatively inclined jaw seats and jaws on said seats, each jaw having opposite approximately parallel gripping faces with teeth having slopes of substantially equal inclination and means attaching said jaws on said seats with either face up.

2. A gripping member of a pipe vise comprising relatively inclined jaw seats and jaws on said seats, each jaw having opposite approximately parallel gripping faces with teeth having slopes of substantially equal inclination and means attaching said jaws on said seats with either end up.

3. A gripping member of a pipe vise comprising relatively inclined jaw seats and jaws on said seats, each jaw having opposite approximately parallel gripping faces with teeth having slopes of substantially equal inclination and means attaching said jaws on said seats with either face up and with either end up.

THORVALD PETERSEN.